United States Patent [19]
Richards

[11] Patent Number: 5,806,869
[45] Date of Patent: Sep. 15, 1998

[54] PROTECTED STEP CONVERSION KIT

[76] Inventor: Robert H. E. Richards, 2071 Flamingo Dr., Costa Mesa, Calif. 92626

[21] Appl. No.: 600,488

[22] Filed: Feb. 13, 1996

[51] Int. Cl.⁶ ........................................................ B60R 3/00
[52] U.S. Cl. ............................................ 280/163; 296/151
[58] Field of Search .................................. 280/163, 770; 296/151

[56] References Cited

U.S. PATENT DOCUMENTS

| | | |
|---|---|---|
| 1,620,614 | 3/1927 | Lambert . |
| 2,255,880 | 9/1941 | Gregorie ................................. 296/151 |
| 2,312,812 | 3/1943 | Geyer . |
| 3,684,311 | 8/1972 | Pierce ...................................... 280/163 |
| 4,029,353 | 6/1977 | Barenyi et al. . |
| 5,050,351 | 9/1991 | Goldbach et al. . |
| 5,257,847 | 11/1993 | Yonehara ................................. 296/151 |

*Primary Examiner*—Robert J. Oberleitner
*Assistant Examiner*—Pamela J. Lipka
*Attorney, Agent, or Firm*—Fulwider Patton Lee & Utecht, LLP

[57] ABSTRACT

A door and running board conversion kit including a hanger framework capable of mounting beneath several different vehicle chassis configurations. A step device is adapted to be supported longitudinally on the hanger framework, and which carries a step deck to be spaced at a selected distance below the bottom edge of a vehicle door and terminating in a longitudinal outboard edge. Such edge is to be covered by a downwardly projecting door skirt fastened to the outboard lower extremity of the door to project downwardly a distance equal to or greater than such selected distance to projection in covering relation over the outboard edge of the step deck when the door is in a closed position.

16 Claims, 8 Drawing Sheets

PROTECTED STEP CONVERSION KIT

BACKGROUND OF THE INVENTION

1. Field of the Invention

The invention relates to a step conversion kit for mounting from the chassis of a motor vehicle.

2. Description of the Prior Art

Sport utility vehicles and minivans are rapidly becoming the fastest growing segments of the automotive industry. These vehicles appeal to drivers of all ages and gender by promising the ruggedness and capabilities of traditional trucks with the luxury and ridability of conventional sedans. Like traditional trucks which tend to ride higher than conventional automobiles, pick up trucks, sport utility vehicles and minivans often require running board type steps to help facilitate access to and from the vehicle. Generally, such steps are available in step kits, and may be purchased and installed as an after market conversion to the vehicle. With modern designs currently emphasizing smooth sleek lines, step kits often include ground effect skirts to preserve the aerodynamic look of the vehicle by concealing the step from view as the door is closed.

Adventuresome owners of sport utility vehicles often subject their vehicles to inclement driving conditions including mud, water and even snow. While conventional step kits when installed produce a very rugged construction capable of withstanding such harsh environments, prolonged exposure results in deposits of dust, debris and often snow or ice on the step thereby increasing the likelihood of transferring the resultant mud, water, or ice into the vehicle interior. Ice, snow and debris is typically drawn into the gap formed between the step and the skirt bottom by wind currents and eddies generated while the vehicle is under way at high speeds. Because interiors are often covered or carpeted with plush carpeting, removal of the transferred mud or debris may require considerable work and involve substantial cost. Additionally, such exposure of the step deck presents the risk of a passenger slipping thereon and raises the risk of the door freezing shut as a result of moisture frozen within the gap.

It has been known in the context of original equipment to provide running boards for automobiles. In the early days when passenger cars were constructed with running boards, the doors were typically integrally formed with outwardly flared outer door panels to cover the outboard edge of the running board during operation of the automobile. U.S. Pat. No. 2,312,812 to Geyer discloses such a device.

Another running board type step is shown in U.S. Pat. No. 3,684,311 to Pierce. Designed to function as a longitudinal mud guard, this device mounts to the outboard edge of the vehicle floorboard to project outwardly beneath the lower edge of the door to prevent the upwardly directed splashing of mud, debris and the like. To accommodate those desiring to use the device as a step, a support structure is also disclosed including reinforcement members mounted to the vehicle frame to carry the step and reinforce from below. While the device serves to protect the lower body of the car from debris, the step is uncovered and constantly exposed, allowing the buildup of dirt and moisture on the step itself. Such buildup raises the risk of a passenger slipping on a slick step surface, or tracking residue from the step into the vehicle interior.

In more recent years, vehicles have been manufactured without running boards or the attendant door flares to be disposed in covering relationship. This is especially true for automobiles due to modern design preferences for sleek, aerodynamic body styles free from side appendages such as running boards. However, to enhance the aesthetics of certain trucks or pickups, typically marketed to the style conscious customer, add on running board kits have been proposed with door skirts which function to conceal the running board edges.

A shrouded step kit to help reduce the above problems is disclosed in U.S. Pat. No. 5,257,847 to Yonehara and assigned to the assignee of the rights in the instant application. This device is in the form of a shrouded truck step kit having a planar step to be disposed beneath the lower edge of a truck cab door and supported by a hanger assembly. The step extends outwardly beyond the lower extremity of a skirt mounted from the bottom edge of a door, and cooperates with the skirt lower extremity to form a gap therebetween. The confronting relation of the step and the skirt operates to shroud the step from view. While this device works well to enhance the aesthetic appearance of the step kit, the gap between the skirt bottom edge and the step upper surface forms a throat which, when the vehicle is underway traveling at high speeds, acts as a venturi drawing dust, debris, rain, snow and other elements into the cavity formed over the step deck surface. At near or below freezing conditions, water may seep into the horizontal gap separating the bottom of the skirt from the top of the step to not only create a slippery and dangerous condition but freeze the two together, preventing opening and closing of the door.

In addition to teaching a running board type step shrouded by a decorative skirt, Yonehara also discloses a cantilevered hanger framework for mounting to a conventional vehicle chassis beam. However, Yonehara fails to disclose a device capable of being installed to a vehicle with a uni-body type construction. Such construction is revolutionary in that the conventional chassis frame is omitted from the vehicle due to incorporation of an integral single-piece body. Additionally, with the advent of uni-body constructions for sport utility vehicles and minivans, it is critical for step conversion kits to have the capabilities of adapting to such vehicles.

Thus the need exists for an economical after market shrouded step kit for sport utility vehicles offering enhanced ground effect aesthetics and functioning to substantially reduce the exposure of the step to mud, water and ice. Furthermore, the need exists for such a kit having the capability of installing to vehicles with different types of chassis or body constructions.

SUMMARY OF THE INVENTION

The door and running board conversion kit of the present invention provides enhanced ground effect aesthetics to sport utility vehicles while reducing the exposure of the step to deposits thereon of common elements such as mud, rain and snow. Subsequent transfer of these elements into the interior of the vehicle is substantially prevented, thus reducing the costs of vehicle maintenance. Additionally, the present invention offers a straightforward hanging assembly for the step thereby reducing the cost of manufacture and installation of the kit.

The conversion kit of the present invention includes a step device having a step deck spaced below a vehicle door and formed with an outboard edge extending laterally and parallel to the bottom edge of the door when closed. The step device is supported by a hanger, which carries the step deck spaced a selected distance below the bottom edge of the door. A skirt is complementally fastened to the bottom extremity of the door and projects downwardly a distance equal to or greater than such selected distance to project in covering relation over the outboard edge of the step deck when the door is in a closed position.

Other objects and features of the invention will become apparent from consideration of the following description taken in conjunction with the accompanying drawings.

DETAILED DESCRIPTION OF A PREFERRED EMBODIMENT

Figure 1:
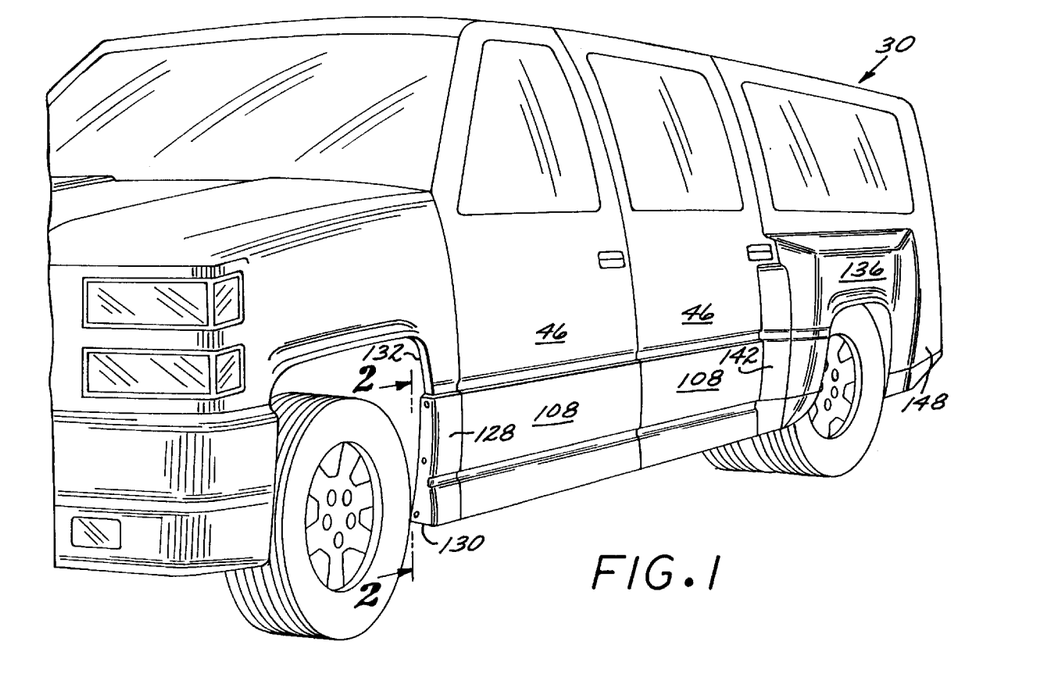
FIG. 1 is a perspective view of a sport utility vehicle incorporating a protected step conversion kit embodying the present invention.

Referring to FIG. 1, sport utility vehicles, of the type generally designated 30, are designed to perform in all terrains while maintaining the comforts and ridability of a conventional sedan. Because such vehicles tend to ride higher than conventional automobiles, many drivers prefer to have running board type steps installed to ease ingress to and egress from the vehicle. It is desirable to incorporate decorative door skirts mounted to the vehicle doors to project downwardly and conceal the steps from view, thus preserving the aesthetic styling of the vehicle.

Present day step kit designs often fail to effectively close off the top surface of the step to unwanted entry of debris such as mud, rain and snow as the driver endeavors to exercise the capabilities of the vehicle over the very terrain prone to being exposed to such debris. Such exposure often results in the collection of unwanted debris on the top surface of the step for subsequent tracking by a passenger's shoes or boots to the interior of the vehicle. In some situations, moisture collected on the step may be subjected to a high rate of heat transfer leading to the formation of ice which, when it spans the gap between the step and the door, serves to essentially freeze the door to the step thus preventing the passenger from opening the door thereby leaving the passenger either trapped in the truck cab or closed out, as the case may be. The present design is intended to overcome this drawback by configuring the skirt to be attachable to the vehicle door in such a manner that, when the vehicle door is closed, the skirt projects downwardly beyond the horizontal plane of the step to conceal it from view and to prevent the lateral buildup of debris on the step by splashed mud, rain, or the like. The skirt adds an enhancing accent to the appearance of the vehicle and is constructed for after market installation, thereby providing significant flexibility for the sport utility vehicle owner. Additionally, the protected step conversion kit includes a minimum number of components making it convenient to install thus reducing costs associated with manufacture and installation.

While the following description is in terms embodying one side of the vehicle, it should be understood that the protected step conversion kit is meant to be installed on both the passenger and driver sides of the vehicle in a symmetrical arrangement. Referring to FIGS. 1, 4 and 7, and 8, a first embodiment of the protected step conversion kit of the present invention includes, generally, a step device 94 disposed beneath the level of a vehicle floor board 34 to be spaced beneath a lower edge of one or more vehicle doors 46. The step device is carried by a hanger framework, generally designated 58, mounted laterally from the vehicle frame in a cantilevered fashion and outwardly to the vehicle doors. One or more decorative door skirts, generally designated 108, are carried from the respective doors 46 and project downwardly in covering relationship over the outboard edge of the step device 94 to protect against entry of debris and to conceal the step from view when the doors are closed.

Figure 5:
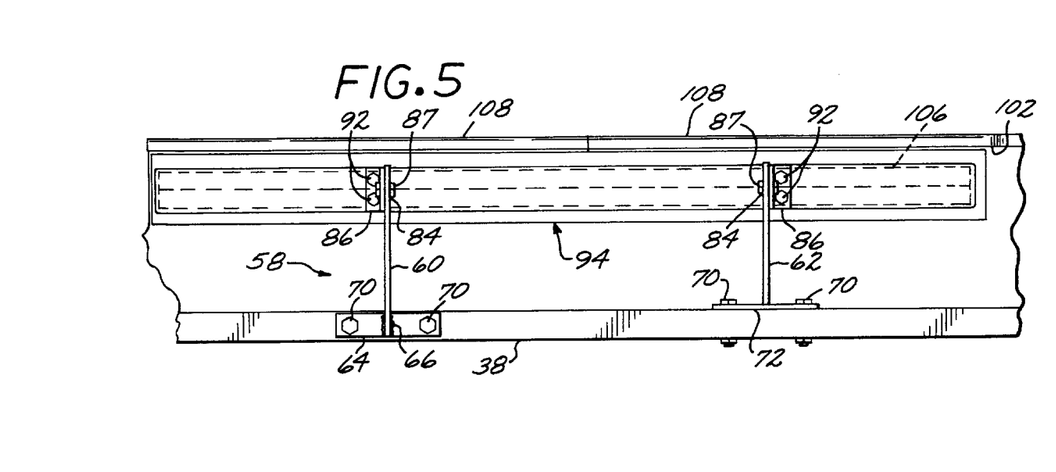
FIG. 5 is a partial bottom plan view, taken along line 5—5 of FIG. 4.
Figure 7:
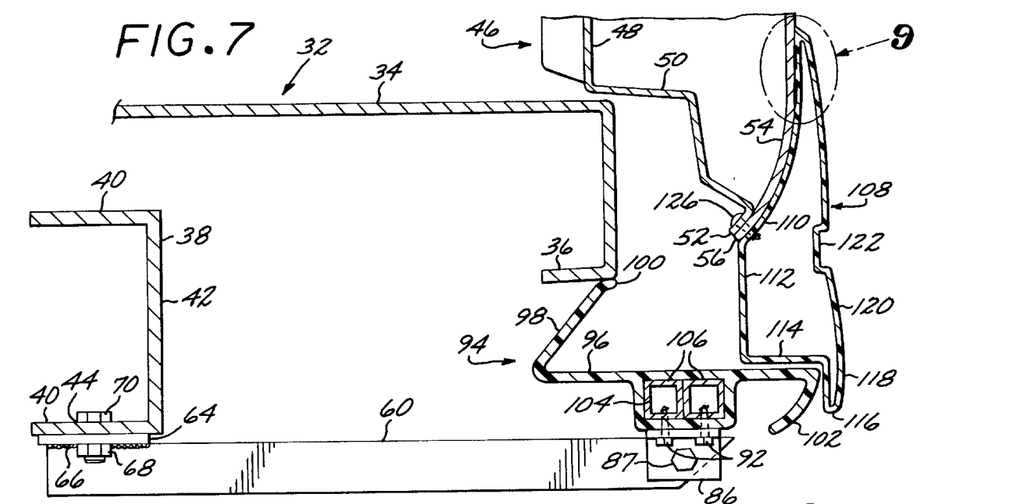
FIG. 7 is a vertical sectional view, in enlarged scale, taken along line 7—7 of FIG. 4.
Figure 8:
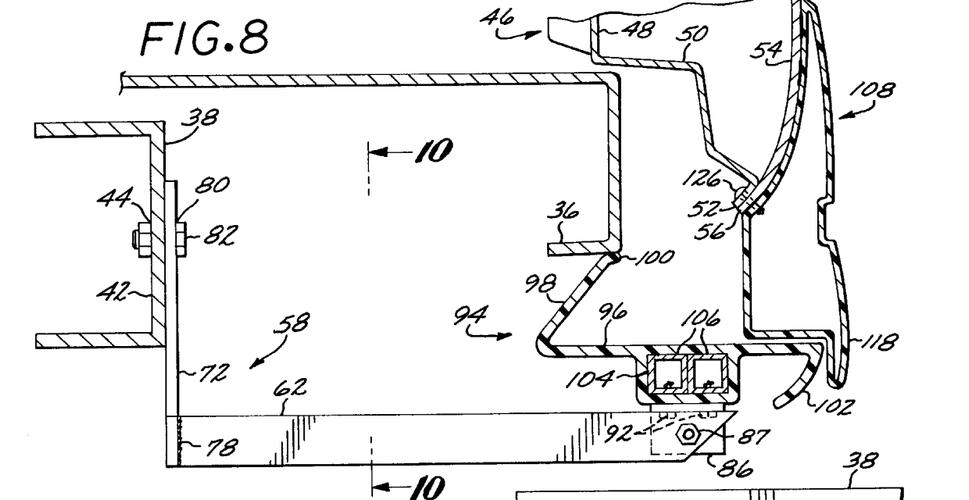
FIG. 8 is a vertical sectional view, in enlarged scale, taken along line 8—8 of FIG. 4.
Figure 9:
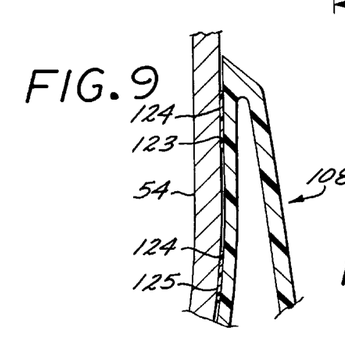
FIG. 9 is a magnified view of the skirt upper panel joint taken from the oval designated 9 in FIG. 7.

Referring to FIGS. 5, 7 and 8, many sport utility vehicles include a conventional heavy-duty undercarriage, or chassis frame 32 upon which the cab of the vehicle is carried. The frame includes a vehicle floorboard 34 formed of heavy gauge sheet metal and horizontally positioned to form the floor of the vehicle interior. The floorboard includes an outboard edge that projects vertically downward and then terminates in an inturned flange 36. Underlying the floorboard is a longitudinal channel beam 38 having respective top and bottom flanges 40 projecting laterally inwardly from a back wall 42 and a plurality of formed mounting bores 44 for mounting respective support bolts. The beam, in the model of vehicle selected for this exemplary description, runs the length of the vehicle, curving upwardly over each wheel well, and spans the distance therebetween. However, the beam does not run uniformly parallel to the ground between the wheel wells. Instead, the beam runs lower near the front of the vehicle to accommodate the engine mounts, then tends to angle upwardly near the rear of the vehicle.

Figure 6:
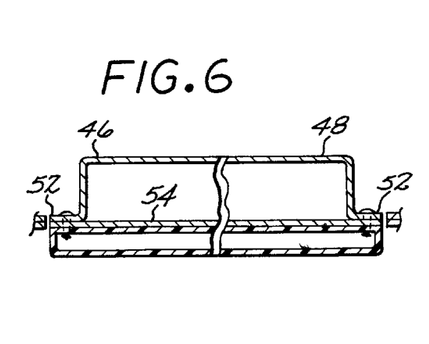
FIG. 6 is a broken horizontal sectional view taken along line 6—6 of FIG. 4.

The sport utility vehicle shown in FIG. 1 includes front and rear doors, generally designated 46, of conventional panel construction. With reference to FIGS. 6 and 7, the doors include, respectively, a vertically upstanding and inwardly dished interior panel 48 bounded at its lower portion by a formed bottom flange having an outwardly projecting horizontal wall 50 which flares downwardly and outwardly to terminate in a marginal lip 52. The door exterior panel projects downwardly to form an inwardly curved rocker panel 54 terminating in a marginal lip 56 (FIG. 8) for attachment to the lip 52 by means of longitudinally spaced tack welds (not shown). In a closed position, the door horizontal wall 50 slightly overlaps in spaced relation the outboard edge of the floorboard 34 to, with a conventional weatherstrip defining a seal, substantially seal the vehicle interior.

Referring to FIGS. 5, 7, 8 and 10, the hanger framework 58 includes a pair of longitudinally spaced laterally projecting front and rear arms 60 and 62, respectively, carried at their respective inboard ends by respective front and rear inboard brackets 64 and 72, which mount to the vehicle chassis beam 38. The arms are formed at their respective outboard ends with bores 84 for pivotally mounting respective angle irons defining support brackets 86 (FIGS. 4 and 5) with pivot bolts 87.

With continued reference to FIGS. 5 and 7, the front mounting bracket 64 comprises a rectangular elongated metal plate or strap mounted to the bottom wall 40 of the beam 38 and is, itself bisected laterally on the bottom side by the upper inboard edge of the front arm 60, which is welded thereto at 66 (FIGS. 5 and 7). The plate is further formed in its opposite sides with bores 68 for receiving bolts 70 to secure the bracket longitudinally to the mounting bores formed in the bottom flange 40 of the chassis channel beam. Attachment of the plate to the channel beam in this manner provides additional cantilevered support for the arm since any loading of the arm will transmit a corresponding torque to the plate which will be inhibited from moving relative to the chassis beam because of the oppositely opposed torque exerted by the beam flange 40 resulting from the heavy duty construction thereof The resulting configuration projects the front arm 60 outwardly from the underside of the channel beam in a cantilever fashion to position the outboard edge of the front arm beneath the door 46.

Figure 10:
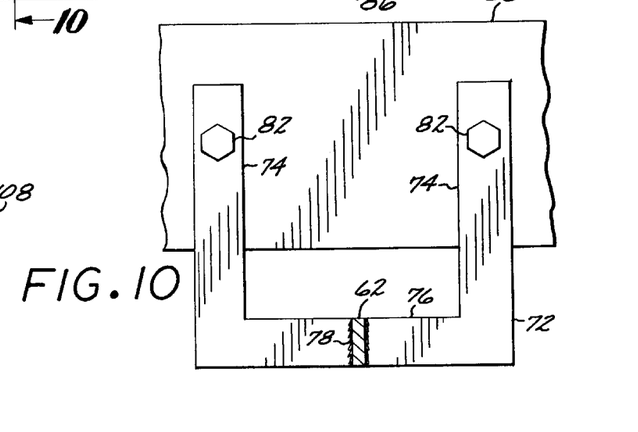
FIG. 10 is a vertical sectional view, taken along line 10—10 of FIG. 8.

Referring to FIG. 10, the rear mounting bracket 72 opens upwardly in a forked configuration to form a pair of upwardly projecting tines 74 disposed at each end of a bottom leg 76. The bottom leg of the bracket abuts and is bisected laterally by the inboard edge of the rear arm 62 and welded thereto at 78 (FIGS. 8 and 10). The tines, respectively, include bores 80 for receiving bolts 82 to mount the bracket to the side wall 42 of the chassis beam 38 such that the bracket projects downwardly, thereby providing a support platform for the rear arm to project horizontally therefrom in parallel relation to the front arm 60, and position the outboard edge of the rear arm beneath the door 46 a distance equivalent to the front arm predetermined distance. Like the metal strap of the front mounting bracket 64, the tines of the rear mounting bracket help to provide additional support for the arm by, when the arm is loaded, cooperating with the lower edge of the channel beam flange to counteract such loading.

The resulting construction of the hanger framework 58 of the first embodiment of the protected step conversion kit allows for convenient adaptation to a variety of conventional vehicle frames while maintaining the positioning of the front and rear arms necessary to mount the step device thereto in proper relation to the vehicle doors 46.

Referring to FIGS. 5, 7 and 8, the step device 94 is constructed from an elongated sheet of rigid material such as sheet metal, extruded polyurethane or, in the preferred embodiment, fiberglass. The step device includes a planar step deck 96 disposed in a horizontal plane typically spaced about three inches beneath the bottom edge of the doors 46. The deck is formed on its inboard edge by an upturned and outwardly angled interior flange 98 terminating in a top marginal edge 100 abutting the bottom side of the inturned flange 36. The deck is formed at its outboard edge to turn downwardly and curve inwardly to form an arcuately shaped concealed runner 102 which nests beneath and inside the door skirts 108 when the doors are closed. A rectangular shaped tube 104 is formed integral with the step deck to project longitudinally for receipt of a pair of side by side longitudinal steel support members 106 which provide longitudinal support along the length of the step device.

Referring to FIGS. 4, 7, 8 and 9, the protected step conversion kit includes door skirts 108 to effectively conceal the step device 94 when the respective doors 46 are closed. The door skirts may be of formed fiberglass construction, with the description of one being sufficient for both. The skirt 108 (FIG. 7) is hollow to define formed interior and exterior walls, with the interior wall 110 being formed in its upper interior portion to curve downwardly and inwardly to, when in vertical registration, complement the curved shape of the door rocker panel 54 and then turns downwardly to form an inboard wall 112 projecting downwardly beneath the marginal lip 56 and then outwardly to form a clearance wall 114 disposed in close spaced relation above the top surface of the step deck 96. The wall then turns downwardly at the outboard edge of such step deck to project downwardly in covering relation over such deck and then turns back on itself at 116 thereby defining a protective lip 118 covering the gap formed between the clearance wall 114 and the deck 96. The outer wall of the door skirt then projects upwardly to form an outside wall 120 which may have a longitudinal groove 122 formed therein for receipt of optional sport striping to enhance the color coordination of the skirts with the vehicle styling. The door skirt is preferably affixed to the door rocker panel 54 using double sided tape 124 (FIG. 9) sandwiched in the upper portion thereof and pop rivets 126 inserted into the bottom flange 52 of the door at each end thereof. The tape used in the preferred embodiment is manufactured by 3M, having an address in St. Paul, Minn. and available under the trade designation Product Y-4210 Mod. No., Tape Type Mfg. Plt 9 Jumbo Mfg Lot MISC. Y4210-YTI-96004-26-7N.

Referring to FIGS. 1–4, the step device 94 projects longitudinally under both the front and rear doors and is formed at its front end with an upturned wheel well stub skirt 128. The stub skirt is hollow, formed to complement the exterior shape of the door skirt 108 and is formed at its front extremity with an inturned vertical hanger flange 130 overlying the back wall 132 of the wheel well to be affixed thereto by fastening screws 134. A similar upstanding hanger flange (FIG. 4) is formed integrally with the step device at the rear extremity thereof and is disposed in overlying relationship and mounted to the front wall of the rear wheel well by fastening screws. The front and rear hanger flanges thus cooperate together to provide additional vertical support for the step device and coact with the cantilevered hanger in carrying the step device 94 and any loads placed thereon.

Figure 4:
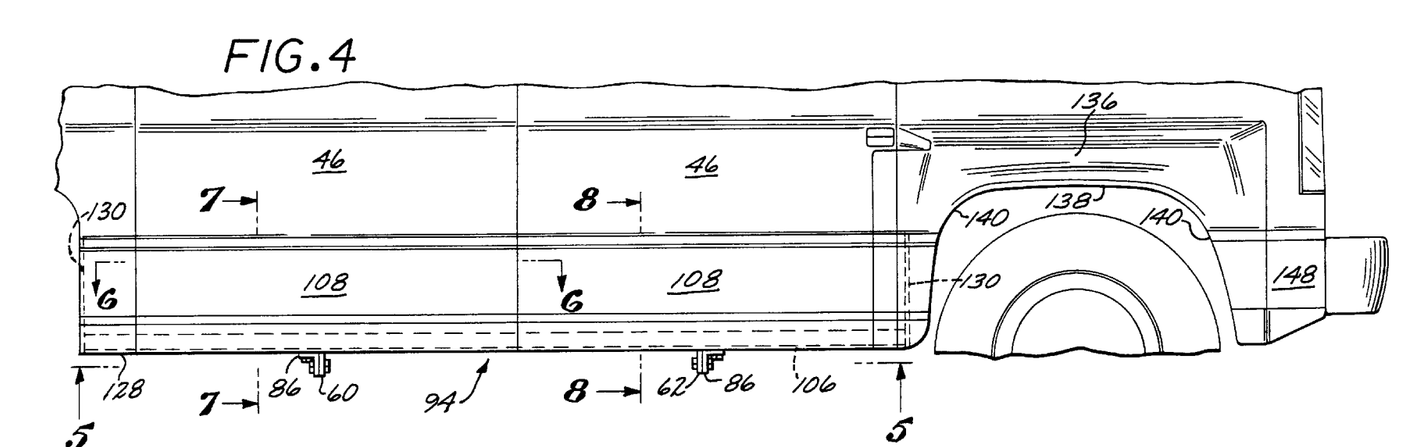
FIG. 4 is a partial right hand side elevational view, in enlarged scale, taken from FIG. 1.

Referring further to FIGS. 1 and 4, the sport utility vehicle shown, commonly referred to as a "dualie", incorporates a replacement rear fender 136 to surround the vehicle rear wheel well. The fender comprises a formed bulbous fiberglass sheet having a centrally raised wheel cover panel 138 bordered by outwardly flared end panels 140 terminating in an inturned peripheral flange (not shown) which complementally abuts the rear wheel well attachment flange (not shown) used to secure the originally installed fender. Fastening screws (not shown) secure the matching fender to the attachment flange. An optional outwardly and rearwardly tapered wing attachment 142 fixed to the rear-most extremity of the rear door 46 and a matching rear body panel skirt 148 bordering the rear of the fender 136 preserve the sleek aerodynamic styling of the vehicle after installation of the matching rear fender.

In practice, the fiberglass skirts of the protected step conversion kit are fabricated using conventional fiberglass casting techniques well known in the art. Likewise, the metal components of the kit comprise conventional hardware and are easily procured with the exception of the U-shaped mounting bracket 72 and the hanger arms 60 and 62, which may be of stamped and welded construction. Partial assembly of the hanger framework 58 should be performed prior to packaging and merely requires the welding of the inboard brackets 64 and 72 to the inboard ends of arms 60 and 62. However, fabrication of the step device 94 by the manufacturer includes additional steps to enable the longitudinal support members 106 and the step deck 96 to function as an integral unit.

The preferred method of fabricating the step device 94 begins by casting a fiberglass mold of the step deck 96, including the inboard and outboard flanges 98 and 102. Once cast, the step deck is placed face down with the longitudinal support members 106 placed longitudinally and centrally upon the deck underside. Once positioned, liquid fiberglass is sprayed liberally over the members and the step deck underside until the members are completely covered externally with a layer of fiberglass. After the fiberglass cures, the resulting step deck underside forms an extremely rigid longitudinal support, with the new fiberglass bonding to the molded fiberglass and encasing the support members therein.

Following procurement of the necessary hardware, and fabrication and partial assembly of the custom components by the manufacturer, the step device 94, hanger framework 58, skirts 108 and 148, fender 136 and attachment 142 and remaining components may be conveniently packaged in kit form for aftermarket conversions. The installer will remove the components from the packaging, inventory for missing parts, and commence installation. The hanger framework 58 is typically assembled first by bolting the front and back inboard brackets 64 and 72 to the vehicle frame channel beam 38 with bolts 70 and 82 such that the front and back arms 60 and 62 project substantially centrally beneath the vehicle doors 46 in parallel relation. Mounting brackets 86 are then secured to the outward ends of the front and back arms with pivot bolts 87 and provide an adjustable mounting surface for attachment of the step device thereto.

Figure 2:
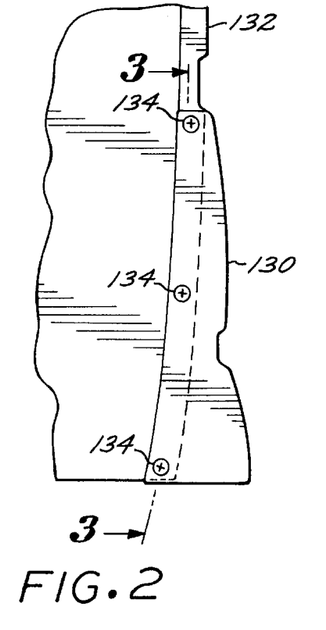
FIG. 2 is a partial elevational view, in enlarged scale, taken along line 2—2 of FIG. 1.
Figure 3:
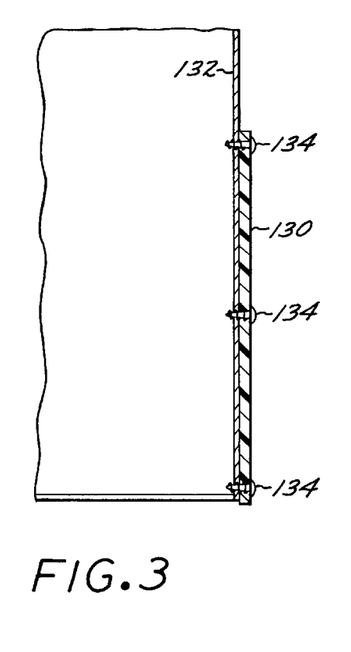
FIG. 3 is a vertical sectional view taken along line 3—3 of FIG. 2.

Installation continues by aligning the step device 94 between the vehicle wheel wells in overlying longitudinal relation to the laterally projecting hanger arms 60 and 62. It will be appreciated that the front and back hanger flanges 130 (rear not shown) formed integrally with the step device provide a helpful fore and aft alignment reference since the panels mount to the respective wheel well attachment walls 132. Additionally, the top marginal edge 100 of the step deck 96 aligns with the bottom edge of the inturned flange 36 of the floorboard 34 to provide a lateral positioning reference. Once aligned, the step device is mounted to the hanger outboard brackets 86 with screws 92 that penetrate and terminate in the longitudinal support members 106. The ends of the step device formed with the hanger flanges 130 are then secured to the wheel well attachment walls 132 with screws 134 (FIGS. 2 and 3).

Following installation of the step device 94, the respective door skirts 108 may then be mated in a complementally overlying relationship with the low portion of the respective front door 46 and shifted vertically to register vertically relative to such doors to establish the desired clearance between the clearance wall 114 and top surface of the step deck 96 (FIGS. 7 and 8) or by placing spacers of the desired thickness therebetween. The registration so attained may then be fixed by then pressing the double sided adhesive tape 124 at 123 and 125 (FIG. 9) against the exterior door surface such that the lower lips 118 of the respective skirts are maintained projecting downwardly at least to the outboard edge of the step deck 96 to span the outboard extent of the respective gaps formed between the respective lower skirt walls 114 and the step deck. Further support for the door skirts is provided by installing rivets 126 at each end of the door skirts (FIG. 6) to mount to the lip 52.

To complete the installation of the protected step conversion kit, the decorative rear fender 136 and wing attachment 142 may be installed at the rear of the vehicle. Removal of the originally installed fender is required and easily accomplished by removing the screws joining the fender to the peripheral attachment flange of the rear wheel well (not shown). Installation of the matching replacement rear fender is performed in the conventional manner, with the inner peripheral flange (not shown) mounted to the peripheral wheel well flange (not shown). The wing attachment is positioned with the rear edge thereof registered with the rear edge of the door 46 such that the outwardly and rearwardly flared panel inclines toward the rear fender 136, serving to smooth the junction at the front edge of the fender and the rear edge of the door. The skirt is secured using double sided tape (not shown).

It will be appreciated by those skilled in the art that the skirt configuration provides an aesthetically pleasing accent to the vehicle while covering the gap between the step deck 96 and the skirt bottom edge 114. Eliminating direct lateral exposure to this gap serves to substantially reduce the amount of mud, rain and snow which may splash up into the gap during use thereby contaminating the step deck. Furthermore, the cantilevered configuration employed by the hanger framework conveniently conforms to the vehicle chassis construction, thereby minimizing the number of parts required for installation, and also the amount of time necessary to install the unit. This reduction of parts and labor substantially reduces the cost of making and installing the kit.

Referring to FIGS. 11 through 16, a second embodiment of the kit of the present invention includes a step device, generally designated 216, and ground effect skirts 238, 258, and 266 formed similar to the skirts of the first embodiment of the present invention. The second embodiment is for installation on a sport utility vehicle 200 (FIG. 11) pick up truck (not shown), or van (not shown) of uni-body construction having a horizontal floor board 204 (FIG. 12) formed in a hollow floor panel including an outboard longitudinal edge terminating in a downwardly and inwardly curved outboard wall 206. Such wall terminates at its lower extremity in a downwardly projecting, longitudinally extending vertical flange 208 joined with a confronting vertical flange 210 formed by the marginal edge of a bottom wall 212 of the floor panel to take advantage of the joint formed by these flanges to conveniently hang the step kit of the present invention therefrom. The sport utility vehicle 200 includes doors 214 of conventional construction as described in the first embodiment and need no further description.

Figure 12:
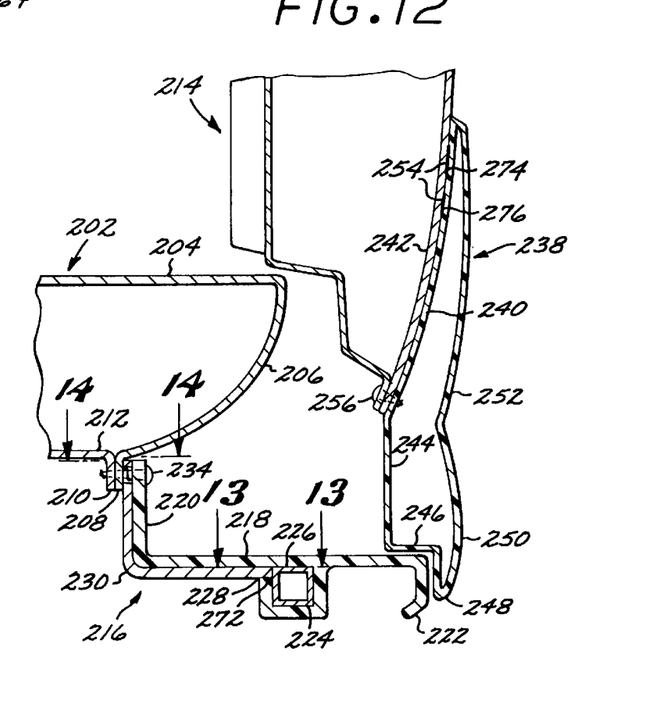
FIG. 12 is a vertical sectional view, in enlarged scale, taken along line 12—12 of FIG. 11.
Figure 13:
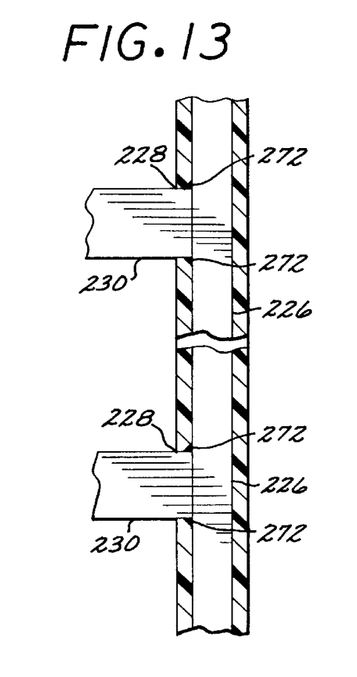
FIG. 13 is a broken horizontal sectional view taken along line 13—13 of FIG. 12.
Figure 14:
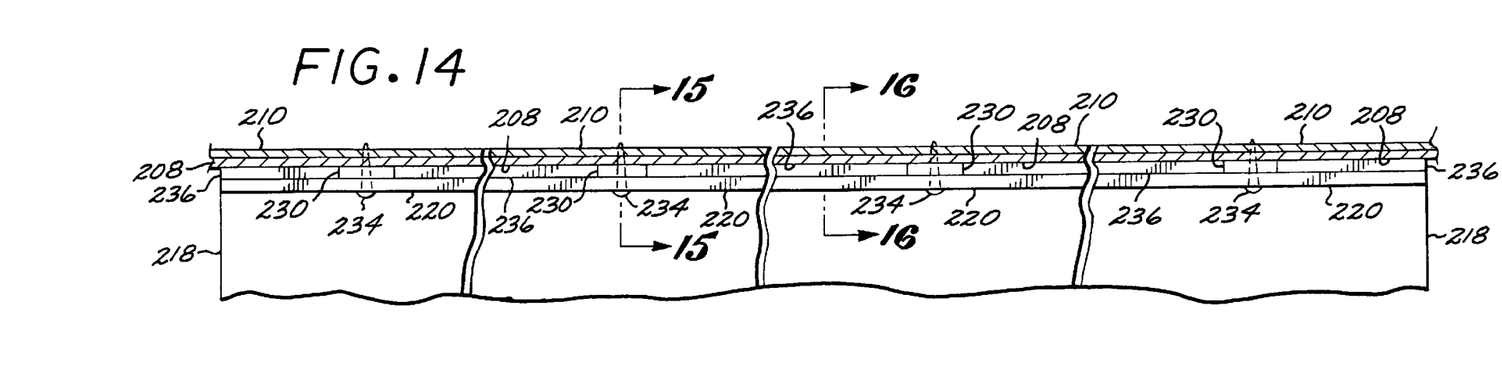
FIG. 14 is a broken horizontal sectional view taken along line 14—14 of FIG. 12.
Figure 15:
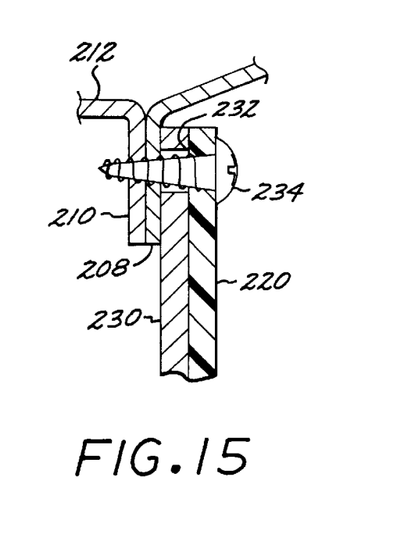
FIG. 15 is a partial vertical sectional view, in enlarged scale, taken along line 15—15 of FIG. 14.
Figure 16:
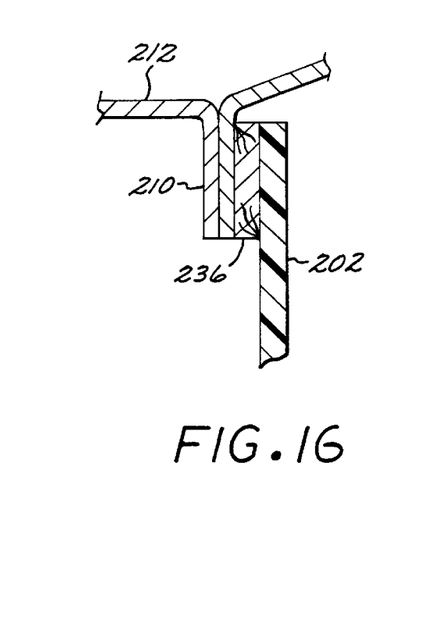
FIG. 16 is a partial vertical sectional view, in enlarged scale, taken along line 16—16 of FIG. 14.

The conversion kit step device 216, shown in FIGS. 12–16, is constructed from a rigid material such as a formed fiberglass sheet or extruded polyurethane and includes a planar step deck 218 disposed in a horizontal plane typically spaced about three inches beneath the bottom edge of the door and suspended from the uni-body floor construction, generally designated 202 (FIG. 12). The deck is of generally Z-shaped construction to be formed at its inboard edge with an upturned interior flange 220. The step deck is formed at its outboard edge with a downturned and slightly inwardly curved facial runner 222 which nests beneath and inside the lower marginal edge 246 of the door skirt 238 when the door 214 is closed and in the embodiment shown, projects the full length of the side of the vehicle from the front wheel well to the rear wheel well. A rectangular shaped tubular channel 224 is formed integral beneath the step deck to project longitudinally for receipt of a complementally shaped longitudinal steel support tube 226 which provides longitudinal support along the length of the step device. The wall of the channel 224 is formed on its inboard side with regularly spaced transverse slots 228 (FIG. 13) which receive the outboard ends of regularly spaced L-shaped cantilever hangers 230 formed, respectively, with vertically extending hanger legs and horizontally projecting support legs projecting under the planar step deck 218 into such slots. The vertical legs of the respective hangers 230 are formed at their upper extremities with bores 232 (FIG. 15) for receiving sheet metal screws 234 for convenient mounting of the step device during installation. A plurality of elongated laminated wood spacers 236 (FIGS. 14 and 16) are sandwiched between the floorboard flange 208 and the deck flange 220 in spaced apart relation between longitudinally adjacent hangers 230 for maintaining the longitudinal alignment of the step deck.

Like the first embodiment of the protected step conversion kit, the second embodiment includes door skirts 238 (FIG. 12) to effectively conceal the step device 216 when the doors 214 are closed. The door skirts of the second embodiment are substantially similar in construction to those of the first embodiment and may be of fiberglass construction, with the description of one being sufficient for both. The skirt 238 is hollow to define formed interior and exterior walls, with the interior wall 240 being formed in its upper interior portion to curve downwardly and inwardly to complement the curved shape of the door rocker panel 242 and then turns downwardly to form an inboard wall 244 projecting downwardly beneath the bottom edge of the door and then outwardly to form a horizontal clearance wall 246 disposed in close spaced relation above the top surface of the step deck 218. The wall then turns downwardly at the outboard edge of such step deck to project downwardly in covering relation over such deck and then turn back on itself at 248 thereby defining a protective lip 250 covering the gap formed between the wall 246 and the deck 218. The wall of the door skirt then projects upwardly to form an outside wall 252. The door skirt is preferably affixed to the door rocker panel using double sided tape 254 sandwiched in the upper portion thereof and pop rivets 256 inserted into the bottom flange 257 of the door at each end thereof.

Figure 11:
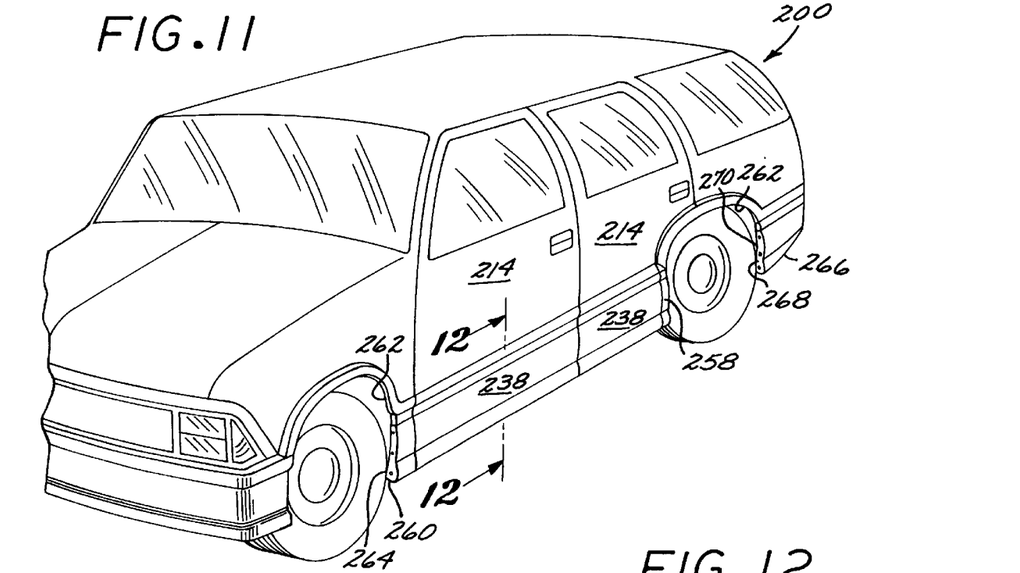
FIG. 11 is a perspective view of a sport utility vehicle incorporating a second embodiment of the protected step conversion kit of the present invention.

As noted above, the step deck runner 222 projects the full length of the side of the vehicle and is formed at its front and rear extremities, respectively, with integrally formed upwardly turned wheel well stub skirts 258, respectively, for attachment to the vehicle body to facilitate support of the outboard side of such step device. With reference to FIG. 11, the front stub skirt is formed with a vertically projecting, laterally inturned hanger flange 260 for projecting laterally in overlying relationship with the back wall 262 of the front wheel well to be affixed thereto by a plurality of fastening screws 264. Similarly, the rear stub skirt is formed with a laterally inturned, vertical hanger flange (not shown) which overlies the outer extremity of the front wall of the rear wheel well to be affixed thereto by mounting screws to thus facilitate in supporting the outboard rear end of the step device.

With further reference to FIG. 11, to complement the rear stub skirt 258, the rear edge of the wheel well mounts a closure panel 268 of a rear wheel well skirt 266 to project downwardly from the rear-most vehicle body panel and join to the rear bumper. The closure panel is formed integrally with the skirt and projects inwardly to mount to the back wall 262 of the rear wheel well with screws 270. Like the door skirts, the upper portion of the rear wheel well skirt may be bonded to the body panel by using double sided adhesive tape.

Fabrication of the fiberglass components is performed similar to the fiberglass components of the first embodiment, and involves conventional fiberglass casting techniques well known in the art. However, like the first embodiment, fabrication of the step device 216 involves added measures to guarantee the structural rigidity necessary to safely support passengers placing their weight thereon. First, the outboard edges of the hangers 230 are fillet welded to the longitudinal support member 226 at 272 (FIG. 13) at equally spaced longitudinal intervals therealong. The appropriate spacing may be established by using a cast fiberglass mold of the step deck 218, including the inboard and outboard flanges 220 and 222. The cast step deck is then placed face down with the support member 226 and hangers 230 laid thereon such that the member lies longitudinally across the underside of the step deck, and the hangers complementally overlie the step deck inboard underside and upturned flange 220. Once positioned, a layer of liquid fiberglass is sprayed over the longitudinal member 226 with the layer substantially encasing the member. Once the fiberglass cures, convenient indicator holes (not shown) may be drilled through the backside of the step deck upturned flange 220 in axial alignment with the hanger bores 232 to aid in placement of self tapping mounting screws 234 during installation of the step device.

Like the first embodiment of the protected step conversion kit, the second embodiment may be conveniently packaged in kit form after the manufacturer fabricates and procures the step device 216, the door skirts 238, and the rear wheel well skirt 266. Installation commences by horizontally aligning the front and rear stub skirt hanger flanges with the front and rear wheel well walls. The top marginal inboard edge of the step device is then positioned against the floorboard flange 208 and affixed thereto in suspending relation by sheet metal screws 234 which pass through the inturned flange indicator holes (not shown) and the hanger bores 232 to penetratingly tap into the flanges 208 and 210. The elongated laminated wooden spacers 236 are inserted into the voids between the respective hangers and are subsequently pinched in place by continued tightening of the screws. Employing such spacers in this manner helps to preserve the straightness of the longitudinally extending step deck by preventing such deck from deforming inwardly towards the pinch weld joint. Additionally, such spacers serve to dispose any moments acting upon the hangers longitudinally along the "pinch weld", thereby relieving concentrated stresses at the hanger attachment points. The ends of the step device are then attached to the respective front and rear wheel wells by affixing respective front and rear stub skirt hanger flanges 260 (rear not shown) to the respective wheel well walls 262.

Following installation of the step device 216, the respective door skirts 238 may then be placed against the lower exterior portions of the respective door rocker panels and registered to the desired vertical spacing relative to the respective step decks as by placing spacers between the respective clearance walls 246 and the top decks of the respective steps. The registered locations thus established are held by affixing double sided adhesive tape at 274 and 276 (FIG. 12) such that the lower lips 250 of the skirts project downwardly at least to the outboard edge of the step deck and span the gaps formed between the lower skirt walls 246 and the deck 218. Installation of pop rivets 256 at each end of the skirt (FIG. 12) to the door secures the skirt at the lowermost portion of the door. To complete installation of the kit, the rear wheel well skirt 266 is fastened to the wheel well attachment flange 262 with fastening screws 270, with the upper portion of the skirt secured to the body panel with double sided adhesive tape. The vehicle doors may then be opened and closed, whereupon the skirt lower edge lip covers the gap formed between the step deck 218 and the skirt clearance walls 246 to substantially protect the step deck from contamination due to mud, rain, or ice from inclement driving conditions.

Those skilled in the art will note and appreciate that the second embodiment of the protected step conversion kit provides an economical and straightforward step device construction capable of being supported by a vehicle of uni-body design. The hanging features of this embodiment are especially convenient due to the lack of a rigid chassis beam in the vehicle chassis construction. By "pinching" the step device to the flanged joint formed by the confronting floorboard flanges 208 and 210, the step conversion kit is able to adapt to vehicles of uni-body construction. Additionally, like the first embodiment, the door skirts incorporated in the second embodiment eliminate direct lateral exposure to the gap formed between the step deck 218 and the skirt clearance wall 246 while simultaneously enhancing the appearance of the vehicle by providing an aesthetically pleasing accent to the exterior thereof.

Figure 17:
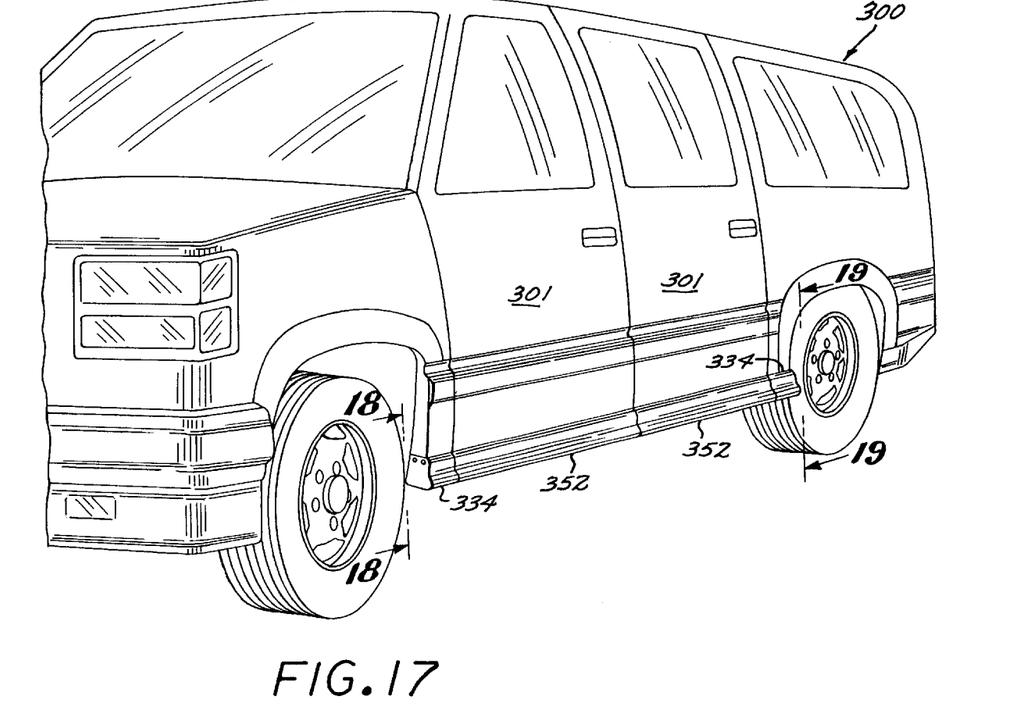
FIG. 17 is a perspective view of a sport utility vehicle incorporating a third embodiment of the protected step conversion kit of the present invention.

Referring to FIGS. 17–25, a third embodiment of the conversion kit of the present invention may be installed in a vehicle 300 such as that shown in FIG. 17 having respective doors 301. The kit includes a step device 312 supported from above by a suspension bracket 314 and laterally by a cantilevered hanger substantially similar to the hanger of the first embodiment. Door skirts 352 are mounted to the vehicle doors 301 and conceal the step device from view while the doors are in a closed position. This embodiment conveniently adapts to chassis configurations including a horizontal vehicle floorboard 302 having an outboard edge 304 bent upwardly to turn outwardly, then downwardly and inwardly on itself at 306 to form a rectangular strut. The chassis construction also includes a longitudinally extending chassis beam 308 having pre-formed mounting holes 310 and disposed beneath the floorboard a spaced distance. Such construction results in a reduced clearance between the floorboard strut and the bottom edge of a closed door.

Figure 23:
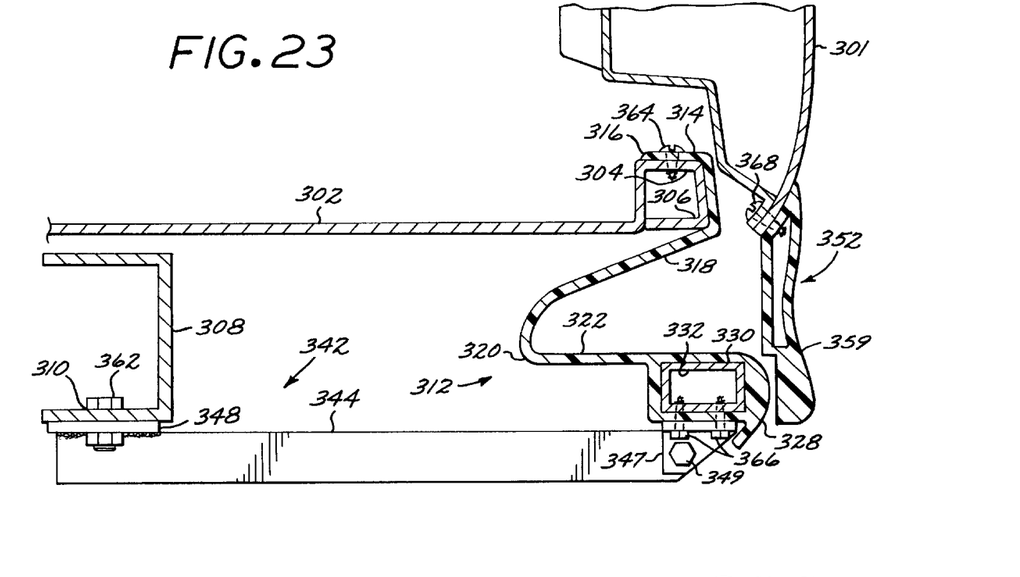
FIG. 23 is a vertical sectional view, in enlarged scale, taken along line 23—23 of FIG. 20.

As shown in FIG. 23, the step device 312 is constructed from a rigid material such as a formed fiberglass sheet or extruded polyurethane and includes a longitudinally extending suspension bracket 314 having an inwardly curled lip 316 complementally formed to engage the floorboard strut 304 and mountingly hang therefrom. The bracket is formed with an intermediate wall 318 that projects inwardly and downwardly from the lip to turn outwardly at 320 and project horizontally therefrom to form a planar step deck 322. A pair of spaced apart slots 324 (FIGS. 21 and 25) are formed through the intermediate wall for receipt of a pair of illumination lights 326. The step deck lies substantially beneath the suspension bracket and is formed at its outboard edge with a downturned and slightly inwardly concave facial runner 328 which laterally abuts a protective lip 359 of the door skirt 352 when the door is in a closed position. A rectangular shaped tube 330 is formed integral with the step deck proximate the outboard edge thereof to project longitudinally for receipt of a longitudinal steel support member 332 that provides longitudinal support along the length of the step device.

Figure 18:
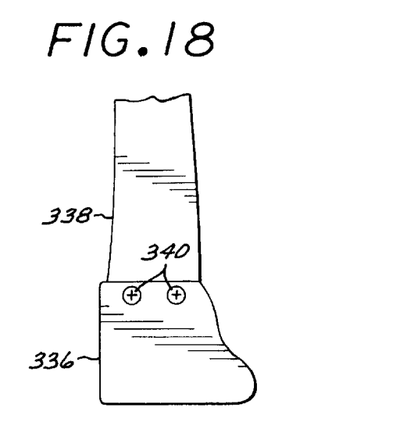
FIG. 18 is a partial elevational view, in enlarged scale, taken along line 18—18 of FIG. 17.
Figure 19:
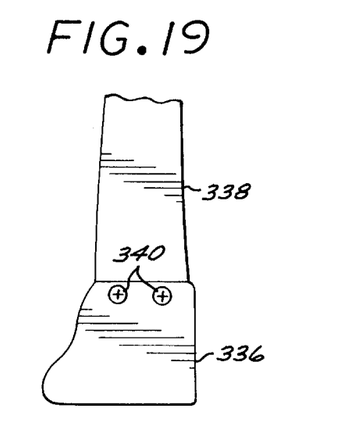
FIG. 19 is a partial elevational view, in enlarged scale, taken along the line 19—19 of FIG. 17.
Figure 20:
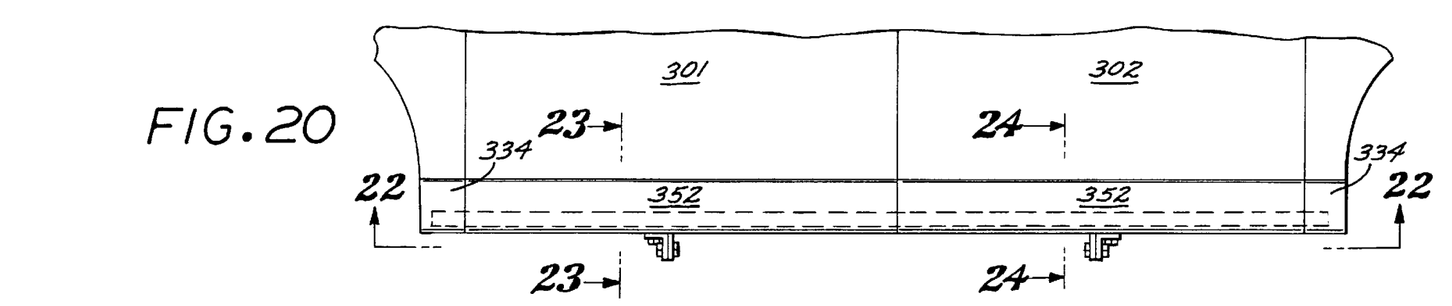
FIG. 20 is a partial right hand side elevational view, in enlarged scale, taken from FIG. 17.
Figure 21:
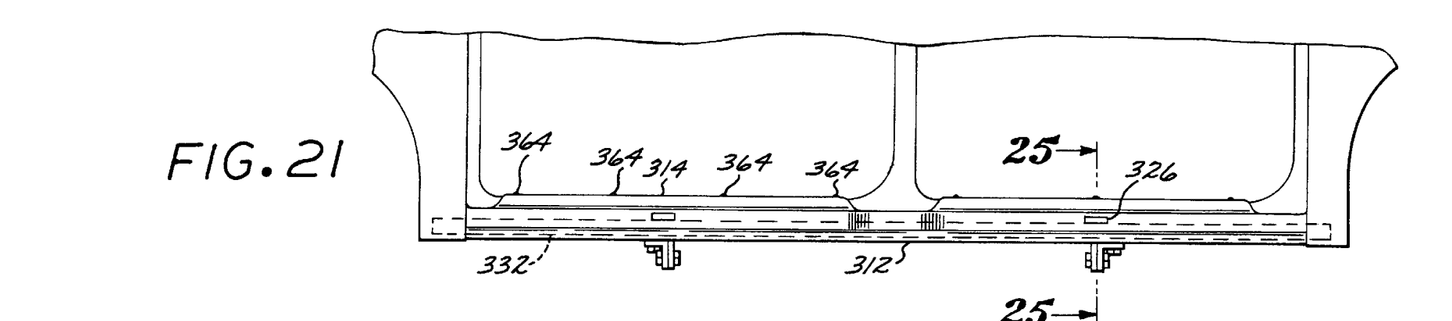
FIG. 21 is a partial right hand side elevational view, in enlarged scale, taken from FIG. 17, with the doors removed for clarity.

Referring to FIGS. 17–19, the step deck projects the full length of the side of the vehicle from the front wheel well to the rear wheel well and is formed endwise with respective stub skirts 334. The stub skirts, respectively, are hollow and formed to complement the exterior shape of the door skirts 352 and are formed with inturned vertical hanger flanges 336 overlying the respective front and rear wheel well walls 338 to be fastened thereto by screws 340. The front and rear hanger flanges cooperate with the suspension bracket and the hanger device to maintain the step device in a structurally rigid position.

With reference to FIGS. 22–25, the hanger 342 includes components substantially similar to the cantilevered hanger of the first embodiment including front and rear arms 344 and 346, respectively, carried at their respective inboard ends by respective front and rear inboard brackets 348 and 350 that mount to the vehicle chassis beam at positions identified by the pre-formed mounting bores. Respective angle irons 347 are pivotally mounted to the outboard ends of the respective arms by respective pivot bolts 349.

Figure 24:
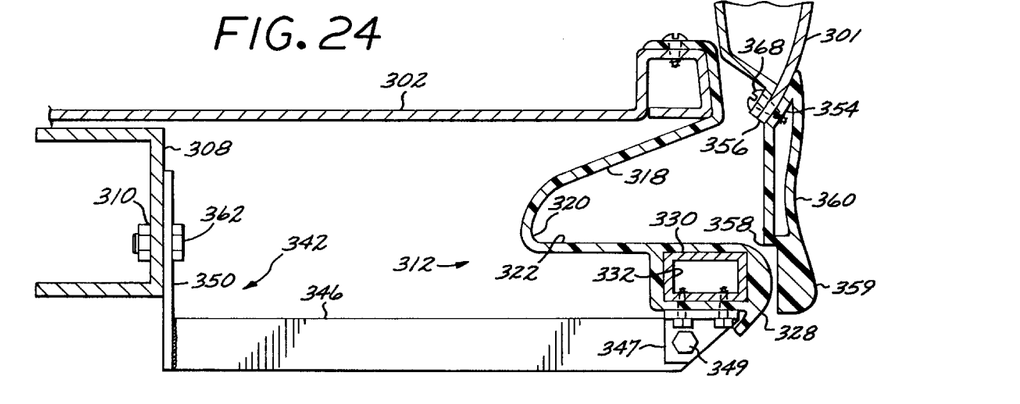
FIG. 24 is a vertical sectional view, in enlarged scale, taken along line 24—24 of FIG. 20.
Figure 25:
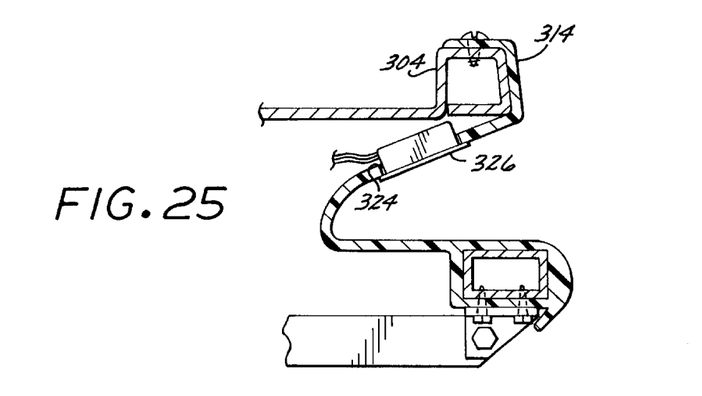
FIG. 25 is a vertical sectional view, in enlarged scale, taken along line 25—25 of FIG. 21.

The third embodiment of the present invention includes fiberglass door skirts 352 similar in construction to the previous two embodiments to effectively conceal the step device 312 when the doors are closed. Referring to FIG. 24, the door skirts include, respectively, an upper interior wall 354 curved to complementally mount to the lower marginal edge of the door 356. Such wall projects downwardly to terminate substantially at the horizontal plane formed by the step deck and then projects outwardly orthogonally at 358 just beyond the outermost point of the facial runner where it then extends downwardly to form an enlarged in cross section protective lip 359 that substantially laterally covers the facial runner. The wall of the door skirt then projects upwardly to form an outside wall 360. A plurality of spaced apart rivets 368 affix the door skirt to the lower marginal edge of the door.

The fiberglass components of the third embodiment of the step conversion kit are fabricated similarly to those of the first embodiment and according to casting techniques well known in the art. Fiberglass molds are typically used to form the skirt components and the step device, with the step deck requiring additional steps to add longitudinal rigidity. Like the first embodiment the underside of the step device is further formed by laying the support bar 332 longitudinally across the underside of the step deck 322 and placing a longitudinal rectangular mold thereover. Liquid fiberglass is then liberally applied to the mold and over the bar to encapsulate it and integrally bond it to the step deck underside. Once cured, the pair of running board lights 326 may be inserted into the slots 324 formed into the intermediate wall and bonded thereto. The resulting structure is then ready for packaging with the molded skirt components and hanger hardware to form a step conversion kit.

Figure 22:
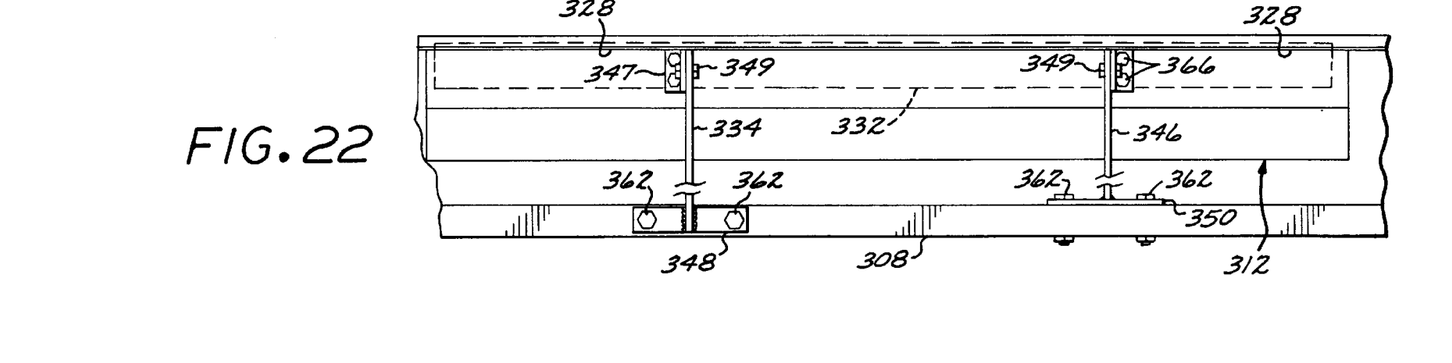
FIG. 22 is a partial bottom plan view, taken along line 22—22 of FIG. 20.

As shown in FIGS. 22–24, installation of the step kit begins by attaching the hanger 342 to the vehicle chassis beam 308. The mounting bores of the respective front and rear brackets 348 and 350 are conveniently aligned to the pre-formed mounting holes 310 found in the beam and bolts 362 inserted therethrough to fix the brackets to the beam. Proper mounting of the brackets positions the front and rear arms outwardly to cantileverly carry the step device at locations corresponding to locations on the step deck most often stepped upon. This allows the hanger arms to experience loads directed primarily downwardly, and thereby minimizing lateral moments tending to rotate the respective arms that might, over time, potentially fatigue mounting of the arms to the deck.

Referring to FIGS. 21 and 23–25, the step device 312 is then installed by fitting the inwardly curled lip 316 of the suspension bracket 314 over the outboard edge 304 of the floorboard strut. Once the device is horizontally aligned, a plurality of mounting screws 364 are used to fasten the upper portion of the lip to the strut thereby suspending the step device from the floorboard. The bottom of the step device is then secured to the pivotally adjustable angle irons 347 and mounted thereto by screws 366. The pivots formed by bolts 349 allow for small deviations in the horizontal alignment of the step deck without adverse consequences in the installation thereof The electrical wiring of the lights may then be connected to supporting circuits inside the vehicle for selected illumination of the step deck upon opening of the doors.

Following installation of the hanger 342 and the step device 312, the skirts 352 may then be affixed to the doors 301 such that the lower formed protective lip 359 effectively conceals the step deck 322 from view when the door is closed. Rivets 368 are typically used to secure the upper interior wall 354 of each skirt to the lower marginal edge 356 of the door.

It will be appreciated that this embodiment of the step conversion kit allows for installation in vehicles having marginal clearances between respective doors and the vehicle floorboard. To compensate for such minimal clearance, the step device of the third embodiment is relatively deeply inwardly recessed from the outboard edge of the floorboard when compared to the previous other embodiments. Such adaptability is one of the key features of the step conversion kit of the present invention. Furthermore, by taking advantage of the floorboard strut to provide added suspension support for the step device, the step kit obtains a substantially increased level of durability and rigidity.

While several particular forms of the invention have been illustrated and described, it will also be apparent that various modifications and changes may be made without departing from the spirit and scope of the invention.

What is claimed is:

1. A door and running board conversion kit for attachment to the body of a recreational vehicle of the type including a passenger door having a bottom extremity configured to curve downwardly and inwardly and terminating in a bottom edge and comprising:

an elongated step device including a planar step deck to be positioned in a horizontally disposed plane spaced a selected distance below said bottom edge and formed with an outboard edge to, when said door is closed, extend coextensive with said bottom edge thereof;

a hanger device for hanging said step device from said body to position said step deck said selected distance below said bottom edge;

a door skirt in the form of a hollow elongated skirt panel formed with an upper attachment portion configured with a concave inwardly facing attachment surface shaped to, when said door skirt is disposed in a mountable position, complementally overlie said bottom extremity and then project downwardly from said bottom extremity to form an inside wall and then to turn outwardly to form a marginal bottom edge to be disposed in close relationship with said step deck when said door is closed, and then to turn downwardly at said outboard edge to form a covering lip that projects downwardly below an extension of said horizontally disposed plane to project over said outboard edge; and fasteners for fastening said skirt to said door whereby said step device may be hung from said body by said hanger device to space said planar step deck in said horizontally disposed plane said selected distance below said bottom edge and said skirt positioned with said upper portion in complementally overlying relationship with said door to project said lip downwardly in covering relation over said outboard edge and said fasteners attached to secure said skirt in position.

2. A door and running board conversion kit as set forth in claim 1 for use with a vehicle having front and rear fenders defining respective front and rear wheel wells and wherein:

said step device includes a rigid longitudinally projecting outboard rail formed at its respective front and rear extremities with upwardly projecting stub skirts for overlying the respective said front and rear fenders and configured with respective laterally projecting hanger flanges for projecting, respectively, into the respective front and rear wheel wells for attachment thereto.

3. A door and running board conversion kit according to claim 2 wherein:

said step device is formed integrally with a longitudinal channel and said rail comprises an elongated structural tube received complementally in said channel.

4. A door and running board conversion kit according to claim 3 wherein:

said step device is formed with an inboard upwardly and outwardly angled interior flange and a downwardly projecting and inwardly angled runner at said outboard edge of said planar step deck to be captured by said door skirt.

5. A door and running board conversion kit according to claim 3 for attachment to a vehicle of uni-body construction and including a hollow floor panel formed with a joint flange spaced downwardly and inwardly from said lower edge and wherein:

said step device includes a formed deck panel configured in transverse cross section with a Z-shape including an inboard edge formed with an upturned hanger flange, a central step deck and a downturned longitudinal runner formed at said outboard edge.

6. A door and running board conversion kit according to claim 3 for attachment to a vehicle including a planar floorboard having a peripheral longitudinal strut disposed beneath said door and wherein:

said step device is formed with a longitudinally overhanging suspension bracket defining an inwardly opening longitudinal channel complementally formed to laterally engage said strut and projecting inwardly and downwardly to form an intermediate wall and turning outwardly to project horizontally in substantially underlying relation to said floorboard to define said planar step deck and further formed with a downturned rounded runner to form said outboard edge of said step deck, said suspension hanger formed to, when positioned to laterally engage said strut and suspend therefrom, coact with said hanger device to vertically support said step deck.

7. A door and running board conversion kit according to claim 1 for attachment to a body of the type that includes a longitudinal chassis beam extending from the front wheel well to the rear wheel well and having portions of varying height with respect to ground level wherein:

said hanger device includes a strut framework having a plurality of lateral arms with respective inboard and outboard ends and respective front and rear mounting brackets, said front and rear mounting brackets cooperating to mount said inboard ends of said arms to said variable height longitudinal chassis beam in a cantilevered fashion to project said arms laterally outwardly in parallel relation at substantially the same height such that said outboard ends are disposed substantially beneath said step device for mounting thereto.

8. A door and running board conversion kit as set forth in claim 7 for use with a vehicle including at least one longitudinal beam formed with a longitudinal lateral surface facing outboard and a bottom surface angling rearwardly and upwardly and wherein:

said front mounting bracket is in the form of a horizontally projecting strap configured with an upwardly facing mounting surface for disposition in confronting relationship with said bottom surface and said rear mounting bracket is in the form of a fork formed with a pair of vertical tines formed with respective laterally inwardly facing surfaces for disposition in confronting relationship with said lateral surface.

9. A door and running board conversion kit according to claim 1 for attachment to a recreational vehicle uni-body having at least one longitudinally extending attachment flange and wherein:

said step device includes a plurality of regularly spaced inboard transverse slots; and said hanger device comprises a plurality of L-shaped brackets formed with upwardly projecting vertical legs of a predetermined thickness and outwardly projecting horizontal legs to project under said step device and formed with outboard ends received in respective ones of said slots.

10. A door and running board conversion kit according to claim 9 for attachment to a vehicle of uni-body construction including a floor configured with a longitudinally projecting joint flange spaced laterally inwardly from the vertical plane of said bottom edge and further including:

elongated spacers having said predetermined thickness and positioned longitudinally between respective hangers and laterally between said joint flange and said interior flange to form an interference fit and, when said step deck is suspended from said joint flange, prevent said interior flange from bowing inwardly.

11. A door and running board conversion kit according to claim 1 wherein:

said marginal edge of said door skirt is extended outwardly to form a bottom wall to be disposed in close spaced relationship with said step deck, when said door is closed and to then turn downwardly at the outer extent of said deck to form said lip.

12. A door and running board conversion kit as set forth in claim 1 for use with a vehicle having front and rear fenders defining respective front and rear wheel wells and having a longitudinal channel beam wherein:

said step device includes a rigid longitudinally projecting outboard rail formed at its respective front and rear extremities with upwardly projecting stub skirts for overlying the respective said front and rear fenders and configured with respective laterally projecting hanger flanges for projecting, respectively, into the respective front and rear wheel wells for attachment thereto, said step device further formed with an inboard upwardly and outwardly angled interior flange and a downwardly projecting and inwardly angled runner at said outboard edge of said planar step deck to be captured by said door skirt;

said hanger device includes a strut framework having a plurality of lateral arms with respective inboard and outboard ends and respective front and rear mounting brackets, said front mounting bracket formed with a horizontally projecting strap configured with an upwardly facing mounting surface for disposition in confronting relationship with said bottom surface, said rear mounting bracket formed into a fork having a pair of vertical tines formed with respective laterally inwardly facing surfaces for disposition in confronting relationship with said lateral surface, said front and rear mounting brackets cooperating to mount said inboard ends of said arms to said variable height longitudinal chassis beam in cantilevered fashion to project said arms laterally outwardly in parallel relation at substantially the same height such that, when said hanger device is attached, said outboard ends are to be disposed substantially beneath said step device when said step device is mounted thereto.

13. A door and running board conversion kit according to claim 1 for attachment to a vehicle of uni-body construction including a floor configured with a longitudinally projecting joint flange spaced laterally inwardly from the vertical plane of said bottom edge and wherein:

said step device includes a rigid longitudinally projecting outboard rail formed with spaced apart longitudinal slots and at its respective front and rear extremities with upwardly projecting stub skirts for overlying the respective said front and rear fenders and configured with respective laterally projecting hanger flanges for projecting, respectively, into the respective front and rear wheel wells for attachment thereto, said step device further formed with a deck panel configured in transverse cross section with a Z-shape including an inboard edge formed with an upturned hanger flange, a central step deck and a downturned longitudinal runner formed at said outboard edge;

said hanger device includes a plurality of L-shaped brackets configured with respective horizontal legs projecting under the inboard side of said central step deck and extending through the respective said slots and terminating in respective outboard ends, the respective L-shaped bracket being further formed with respective vertical arms configured at their respective top ends to be disposed in overlying relationship with said joint flange for connection thereto.

14. A door and running board conversion kit according to claim 1 for attachment to a vehicle including a planar floorboard having a peripheral longitudinal strut disposed beneath said door and wherein:

said step device includes a rigid longitudinally projecting outboard rail formed at its respective front and rear extremities with upwardly projecting stub skirts for overlying the respective said front and rear fenders and configured with respective laterally projecting hanger flanges for projecting, respectively, into the respective front and rear wheel wells for attachment thereto, said step device further formed with a longitudinally overhanging suspension bracket defining an inwardly opening longitudinal channel complementally formed to laterally engage said strut and projecting inwardly and downwardly to form an intermediate wall and turning outwardly to project horizontally in substantially underlying relation to said floorboard to define said planar step deck and further formed with a downturned rounded runner to form said outboard edge of said step deck;

said hanger device includes a strut framework having a plurality of lateral arms with respective inboard and outboard ends and respective front and rear mounting brackets, said front mounting bracket formed with a horizontally projecting strap configured with an upwardly facing mounting surface for disposition in confronting relationship with said bottom surface, said rear mounting bracket formed into a fork having a pair of vertical tines formed with respective laterally inwardly facing surfaces for disposition in confronting relationship with said lateral surface, said front and rear mounting brackets cooperating to mount said inboard ends of said arms laterally outwardly in parallel relation at substantially the same height such that, when said hanger device is attached, said outboard ends are to be disposed substantially beneath said step device when said step device is mounted thereto.

15. A method of assembling a protected step conversion kit to a recreational vehicle of the type having at least one door having a bottom edge carried from a vehicle body to be disposed in a predetermined relation to a vehicle floorboard and including the steps of:

selecting a conversion step kit of the type including an elongated step device formed with a planar step deck having an outboard edge for disposition in a substantially horizontal plane a selected distance below said bottom edge;

selecting a hanger device having an inboard end for attachment to said vehicle to carry said step device with said deck disposed in said substantially horizontal plane;

selecting at least one door skirt in the form of a hollow elongated skirt panel formed with an upper attachment portion configured with a concave inwardly facing attachment surface shaped for mounting to said door and having a lower outwardly projecting horizontal wall to, when said deck is disposed in said horizontal plane, complementally overlie said planar step deck to form a gap therebetween and including a downwardly projecting lip formed to cover said gap with said door in a closed position;

mounting said hanger device inboard end beneath said floorboard;

hanging said step device from said hanger device to dispose said deck in said horizontal plane;

aligning said upper attachment portion of said door skirt to said bottom extremity to position said lip when said door is in a closed position, in lateral covering position over said outboard edge; and affixing said door skirt to said door.

16. A door and running board conversion kit for attachment to a body of a recreational vehicle of a type including a passenger door having an exterior wall including a convex lower surface, terminating in a bottom edge, and comprising:

an elongated step device including a planar step deck to be spaced a selected distance below said bottom edge and formed with an outboard edge to, when said door is closed, extend coextensive with said bottom edge thereof;

a hanger device for hanging said step device from said body to position said step deck said selected distance below said bottom edge;

a door skirt formed with an upper attachment portion configured with a concave inwardly facing attachment surface shaped to complementally confront said convex lower surface and then to project downwardly to form an inside surface and then to turn outwardly to form a bottom and then to turn downwardly at said outboard edge of said deck to form a lip; and fasteners for fastening said skirt to said door whereby said step device may be hung from said body by said hanger device to space said outboard edge of said step deck said selected distance below said bottom edge and said skirt mounted in position with said upper portion complementally confronting said convex lower surface to project said lip downwardly in covering relation over said outboard edge and said fasteners attached to secure said skirt in position.

* * * * *